(12) United States Patent
Hamatani

(10) Patent No.: US 7,457,057 B2
(45) Date of Patent: Nov. 25, 2008

(54) DISK DRIVE DEVICE AND OPTICAL DISK APPARATUS EQUIPPED WITH THE SAME

(75) Inventor: Yutaro Hamatani, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 202 days.

(21) Appl. No.: 11/484,387

(22) Filed: Jul. 11, 2006

(65) Prior Publication Data

US 2007/0008632 A1    Jan. 11, 2007

(30) Foreign Application Priority Data

Jul. 11, 2005    (JP)    ............... 2005-201851

(51) Int. Cl.
G02B 7/02    (2006.01)
(52) U.S. Cl. ............ 359/814; 359/824; 369/44.14
(58) Field of Classification Search .......... 359/814, 359/824; 351/44.14
See application file for complete search history.

(56) References Cited

U.S. PATENT DOCUMENTS

2004/0052170 A1*    3/2004    Ikeda et al. ............... 369/44.21

FOREIGN PATENT DOCUMENTS

JP    2004-164732    6/2004
JP    2004-220769    8/2004

OTHER PUBLICATIONS

Patent Abstracts of Japan, Publication No. 2004-220769, Publication Date: Aug. 5, 2004, 2 pages.
Patent Abstracts of Japan, Publication No. 2004-164732, Publication date: Jun. 10, 2004, 2 pages.

* cited by examiner

*Primary Examiner*—Joseph Martinez
(74) *Attorney, Agent, or Firm*—Osha · Liang LLP

(57) ABSTRACT

An optical disk apparatus that includes: a disk drive device having a guide shaft secured to a chassis and an optical pickup which is rotatably attached to the guide shaft and moves along the guide shaft. The optical pickup comprises a lens holder holding an objective lens for emitting a light beam to be projected onto an optical disk and having a sliding hole, a shaft passing through the sliding hole, a focus coil wound around an outer wall of the sliding hole, and a hexagonal magnetic plate fit over the outer wall of the sliding hole so as to be adjacent to the focus coil. One side of the hexagonal magnetic plate is bent toward the focus coil so that the magnetic plate is inclined with respect to a plane having a normal line parallel to a sliding direction of the lens holder.

2 Claims, 5 Drawing Sheets

PRIOR ART

DISK DRIVE DEVICE AND OPTICAL DISK APPARATUS EQUIPPED WITH THE SAME

BACKGROUND OF THE INVENTION

1. Field of the Invention

This invention relates to an optical disk apparatus for reproducing and audio/video recording an optical disk such as CD and DVD and a disk drive device incorporated in the apparatus.

2. Description of the Related Art

An optical disk apparatus for reproducing or audio/video recording an optical disk such as CD and DVD incorporates a disk drive device for rotating the optical disk to be read. The disk drive device focuses optical beams on an optical disk surface using an objective lens and creates spots. The smaller size of the spots can realize the higher recoding density of information for the optical disk. The disk drive device, therefore, has a mechanism for reducing the spot size. Namely, the mechanism is prepared which causes the beams from the optical pickup to impinge on the optical disk surface at right angles to prevent coma aberration from being generated.

On the optical disk, tracks with information recorded are formed. Tracking the tracks is carried out by rotation of the optical disk based on the rotation of a turn table and movement of the optical pickup along a guide shaft. The optical disk has warpage and eccentricity. Owing to them, the recorded position of information on the optical disk cannot be tracked exactly by only the above technique. Namely, also where the information recorded position is misaligned by disturbance not predictable, an adjustment mechanism for exactly tracking the position to read the information must be provided.

FIG. 6 is a sectional view of a conventional optical pickup. An objective lens 21 is secured to a lens holder 20. The lens holder 20 is supported by a lens holder supporting portion (not shown) which moves along the guide shaft. The lens holder 20 has a sliding hole 22. The lens holder supporting portion has a shaft 23. With the shaft 23 passing through the sliding hole 22, the lens holder 20 is supported by the lens holder supporting portion.

In the above conventional adjustment mechanism, the lens holder 20 is moved along the extending direction of the shaft 23 so that the spot of a light beam is focused. In addition, the lens holder 20 is made rotatable around the shaft 23 so that the track is aligned two-dimensionally. Specifically, between the lens holder 20 and the lens holder supporting portion, a magnetic driving portion for focusing and another driving portion for tracking are provided. These magnetic portion for focusing and driving portion for tracking constitute the above adjustment mechanism. Generally, on the side of the lens holder 20, a focus coil 25 and a tracking coil (not shown) are loaded, whereas on the side of the lens holder supporting portion opposite to these coils, a permanent magnet (not shown) for focusing and another permanent magnet for tracking are arranged.

By passing a current through the focus coil 25, the lens holder 20 is vertically driven by magnetic force, thereby making the adjustment of focusing of the objective lens 21 attached to the lens holder 20. Likewise, by passing a current through the tracking coil, the lens holder 20 is rotated around the shaft 20, thereby making the adjustment of tracking. By providing the mechanisms for focusing adjustment and for tracking adjustment as described above, even when the information recording position is misaligned owing to the disturbance, deviation of the spot position from the track can be dealt with, thereby permitting the track position to be exactly tracked.

However, a predetermined clearance (e.g. 5 mm) must be provided between the sliding hole 22 of the lens holder 20 and the shaft 23 of the lens holder supporting portion. This clearance will produce wobbling during the movement of the lens holder 20 in the above alignment. An arrow of broken line in FIG. 6 indicates the direction of wobbling. If the wobbling occurs, the jitter is deteriorated to attenuate the quality of information. As a result, the performance of the reproducing apparatus will be attenuated. In order to obviate such inconvenience, in JP-A-2004-164732, two plate-like ferromagnetic bodies are arranged to sandwich the focus coil vertically to make the adjustment of losing magnetic balance so that two positions undergoing magnetic force are located apart from each other.

Further, JP-A-2004-220769 discloses a configuration in which owing to the magnetic suction force acting between a magnetic plate and a magnet, the force in the direction of pushing the bearing segment of the lens holder against its supporting portion acts on the lens holder.

SUMMARY OF THE INVENTION

However, the configurations disclosed in JP-A-2004-164732 and JP-A-2004-220769 cannot sufficiently restrain inclination or vibration of the lens holder. Further, there are other causes of producing the inclination of the lens holder 20, i.e. that of the objective lens 21, for example, changes in the installing posture of the apparatus such as the vertical or horizontal installation thereof, tension of a flexible printed circuit board (FPC) connected to the lens holder 27, variations in the position of the center of gravity of the lens holder 20 and the inclination due to an attaching error of the magnetic plate 30.

An object of this invention is to provide a disk drive device which can reduce an instable factor leading to the inclination of an objective lens, gives little inclination of the objective lens even when the installing posture of an apparatus is changed and can stably read disk information, and an optical disk apparatus equipped with the disk drive device.

An aspect of this invention provides a disk drive device having a guide shaft secured to a chassis and an optical pickup which is rotatably attached to the guide shaft and moves along the guide shaft. The optical pickup includes a lens holder holding an objective lens for emitting a light beam to be projected onto an optical disk and having a sliding hole, a shaft passing through the sliding hole, a focus coil wound around an outer wall of the sliding hole, and a magnetic plate fit over the outer wall of the sliding hole. The magnetic plate is bent toward the focus coil so that the magnetic plate is inclined with respect to a plane having a normal line parallel to a sliding direction of the lens holder.

In accordance with this configuration, since the magnetic plate is attached in the state inclined previously so that the direction of magnetic inclination can be fixed.

Further, the end of the magnetic plate is bent so that the magnetic plate is inclined relative to the plane having the normal line parallel to the sliding direction of the lens holder.

In accordance with this configuration, the magnetic plate can be attached inclinedly in a simple construction.

Further, another aspect of this invention provides an optical disk apparatus equipped with a disk drive device having a guide shaft secured to a chassis and an optical pickup which is rotatably attached to the guide shaft and moves along the guide shaft. The optical pickup includes a lens holder for holding an objective lens emitting a light beam to be projected onto an optical disk and having a sliding hole, a shaft passing through the sliding hole, a focus coil wound around an outer wall of the sliding hole, and a hexagonal magnetic plate fit over the outer wall of the sliding hole so as to be adjacent to the focus coil, and the one side of the hexagonal magnetic plate is bent toward the focus coil so that the magnetic plate is inclined with respect to a plane having a normal line parallel to a sliding direction of the lens holder.

In accordance with this invention, since the magnetic plate is attached in a state previously inclined, the inclination angle of the magnetic plate can be controlled and so the device can be designed considering the stable direction based on the inclination of the magnetic plate. Therefore, the inclination angle of the magnetic plate can be designed considering the installing posture of the optical disk apparatus such as the vertical or horizontal installation thereof. As a result, the instable factors leading to the inclination of the objective lens are reduced, thereby permitting the disk information to be read out stably.

DETAILED DESCRIPTION OF THE PREFERRED EMBODIMENTS

Figure 1:
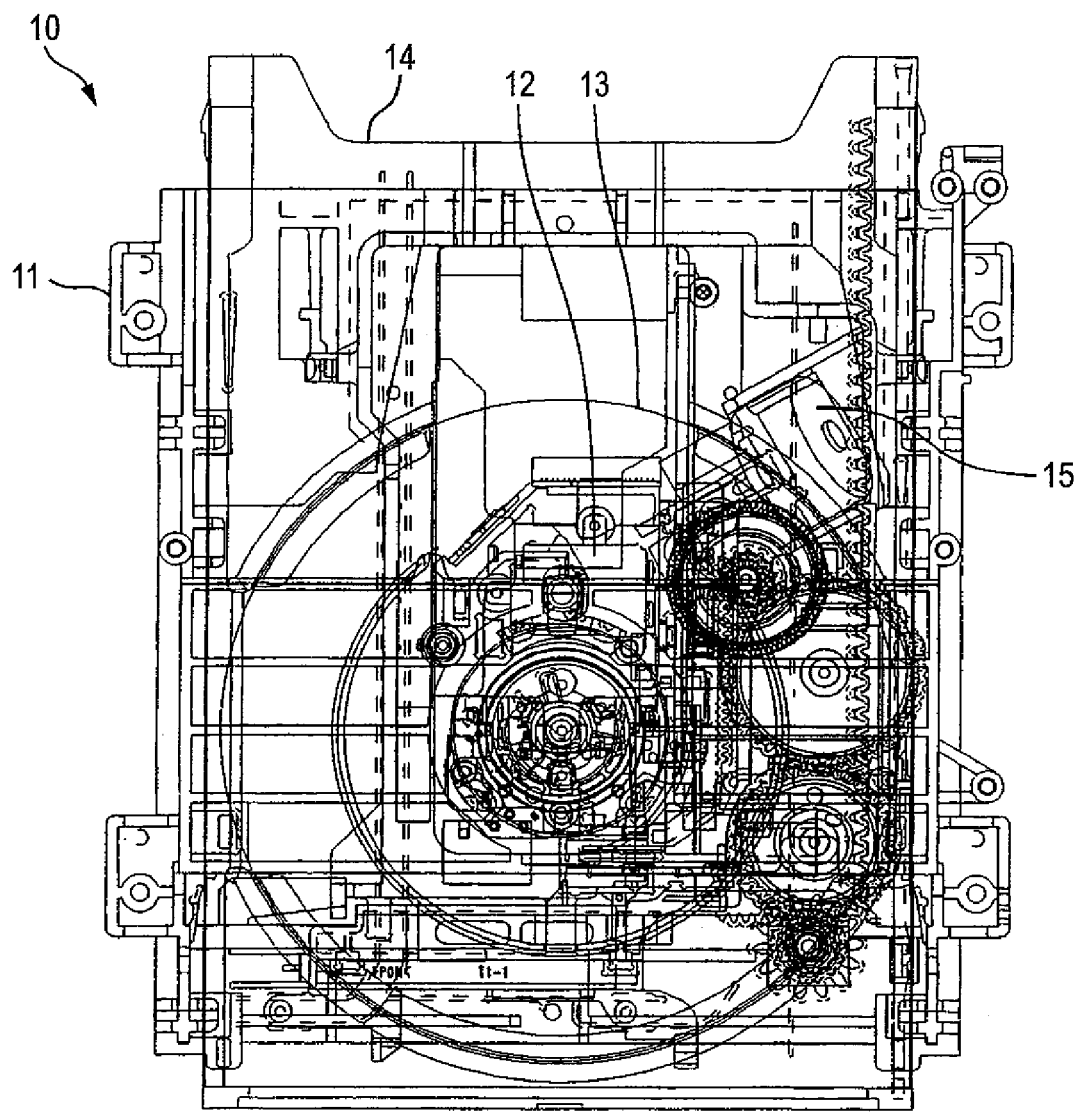
FIG. 1 is a plan view of a disk drive device according to an embodiment of this invention.

FIG. 1 is a plan view of a disk drive device. A disk drive device 10 includes a chassis 11 on which respective components are secured; a guide shaft 11a (see FIG. 2) secured to the chassis 11; an optical pickup 12 which moves along the guide shaft; a tray 14 for transferring the optical disk 13; and a loading motor 15 for driving the tray 14.

In this disk drive device 10, the optical pickup 12 is engaged to the guide shaft so that it is rotatable around the guide shaft and also is movable along the guide shaft.

Figure 2:
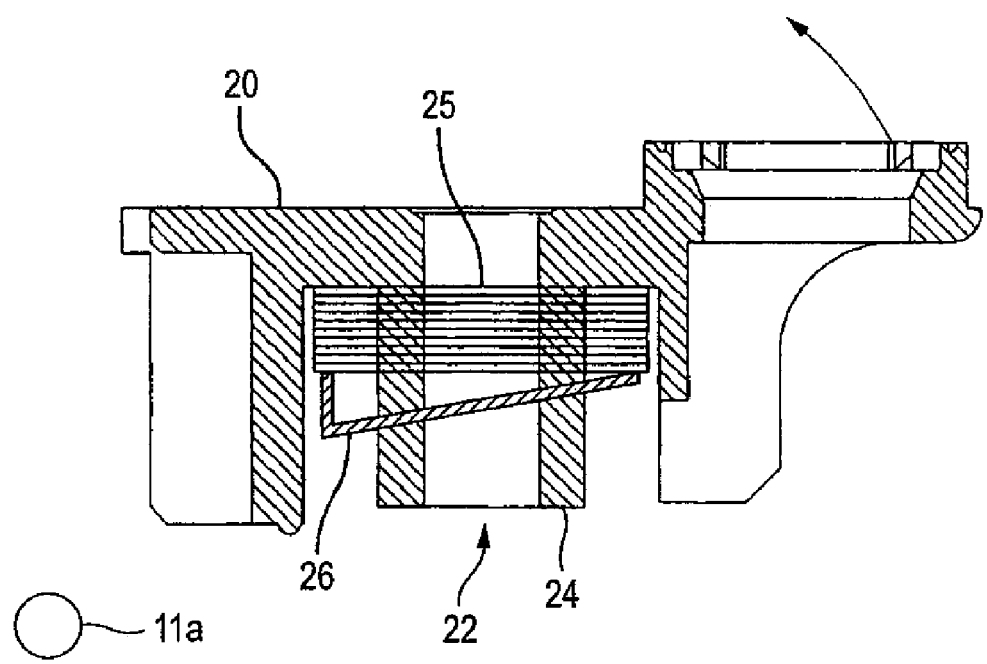
FIG. 2 is a sectional view of an optical pickup.
Figure 3:
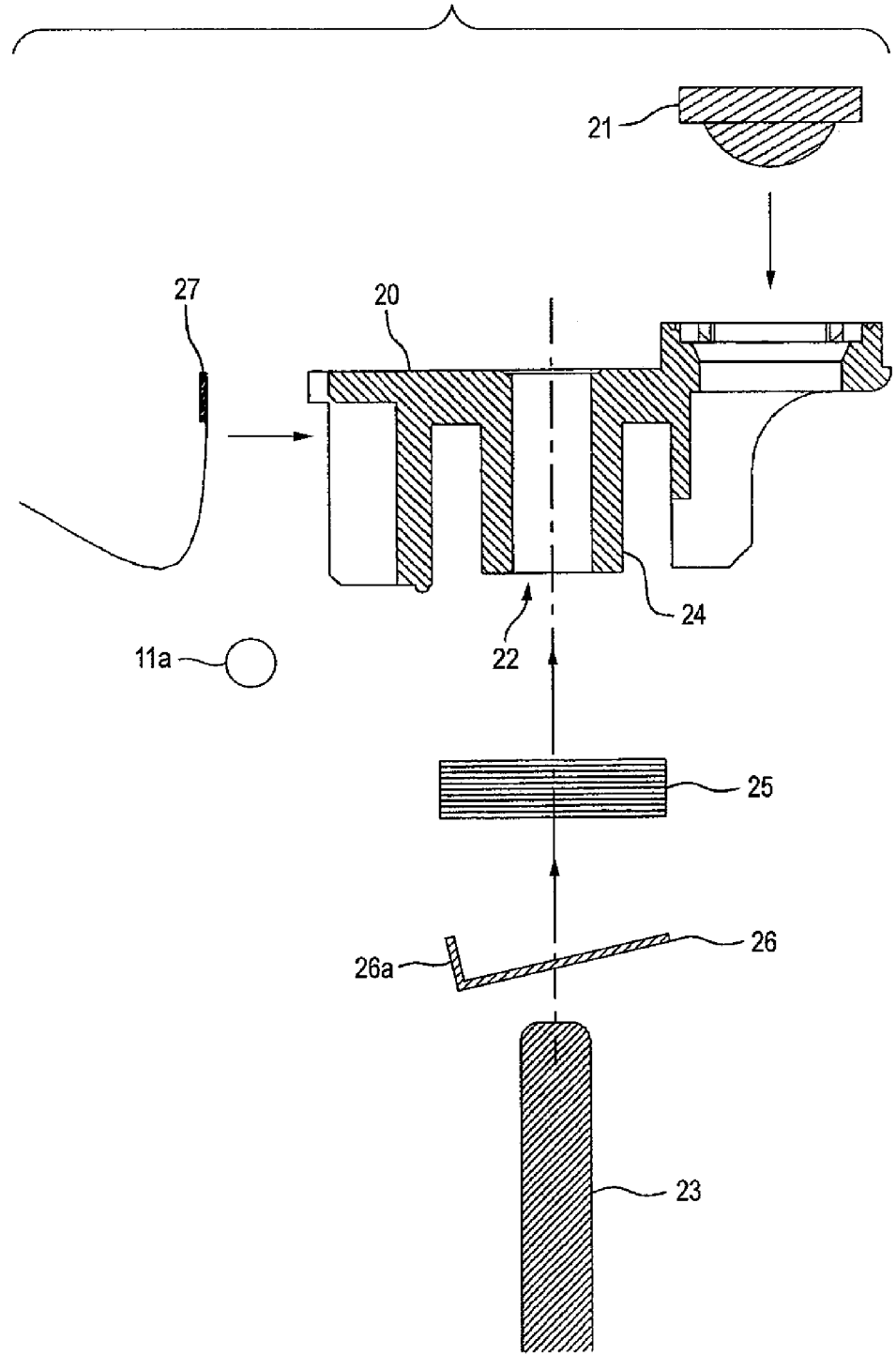
FIG. 3 is an exploded view of FIG. 2.

FIG. 2 is a sectional view of the optical pickup 1. FIG. 3 is an exploded view of FIG. 2. The optical pickup 1 includes a lens holder 20 and a lens holder supporting portion (not shown) for supporting the lens holder 20. The lens holder 20 holds an objective lens 21 for emitting a light beam to be projected onto the optical disk. The lens holder 20 has a sliding hole 22 made in the direction in parallel to a light beam emitting direction. The lens holder supporting portion has a shaft 23. With the shaft 23 passing through the sliding hole 22, the lens holder 20 is supported by the lens holder supporting portion.

Figure 4:
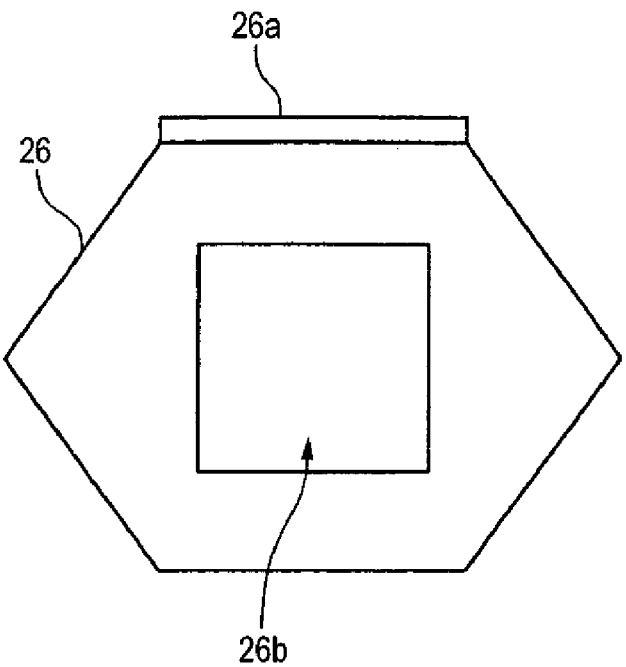
FIG. 4 is a plan view of an example of a magnetic plate.

Around the outer wall 24 of the sliding hole 22, a focus coil 24 is wound. Further, a magnetic plate 26 is fit over the outer wall of the sliding hole 22 so as to be adjacent to the focus coil 25. FIG. 4 is a plan view of the magnetic plate 26. The magnetic plate 26 is hexagonal in the outer shape. The one side thereof is bent toward the focus coil 25 to form a bent segment 26a. Thus, in the state where the magnetic plate 26 is attached, the end of the bent segment 26a is in contact with the focus coil 25 so that the magnetic plate 26 is inclined relative to a plane having a normal line parallel to the sliding direction of the lens holder 20. The outer shape of the magnetic plate 26 should not be limited but may be a polygon or a circle. The magnetic plate 26 has a square opening 26b. The opening 26b is designed so as to match the sectional shape of the outer wall 24 of the sliding hole 22.

In order that the magnetic plate 26 is attached in its inclined state, a projection or a separate component may be used instead of the bent segment 26. Further, the projection or separate component may be provided on the side of the focus coil 25. The magnetic plate 26 may be made of the magnetic material such as stainless steel or nickel. Particularly, nickel is difficult to rust, easily available and easily forcibly worked since it has a face-centered cubic structure.

An FPC 27 is connected to the lens holder 20. In the above adjustment mechanism, the lens holder 20 is moved along the extending direction of the shaft 23 so that the spot of a light beam is focused.

In addition, the lens holder 20 is made rotatable around the shaft 23 so that the track is aligned two-dimensionally. Specifically, between the lens holder 20 and the lens holder supporting portion, a magnetic driving portion for focusing and another driving portion for tracking are provided. These magnetic portion for focusing and driving portion for tracking constitute the above adjustment mechanism. For example, like the focus coil 25, on the side of the lens holder 20, a tracking coil is loaded, whereas on the side of the lens holder supporting portion opposite to these coils, a permanent magnet (not shown) for focusing and another permanent magnet for tracking are arranged.

By passing a current through the focus coil 25, the lens holder 20 is vertically driven by magnetic force, thereby making the adjustment of focusing of the objective lens 21 attached to the lens holder 20. Likewise, by passing a current through the tracking coil, the lens holder 20 is rotated around the shaft 20, thereby making the adjustment of tracking. By providing the mechanisms for focusing adjustment and for tracking adjustment as described above, even when the information recording position is misaligned owing to the disturbance, deviation of the spot position from the track can be dealt with, thereby permitting the track position to be exactly tracked.

Figure 5:
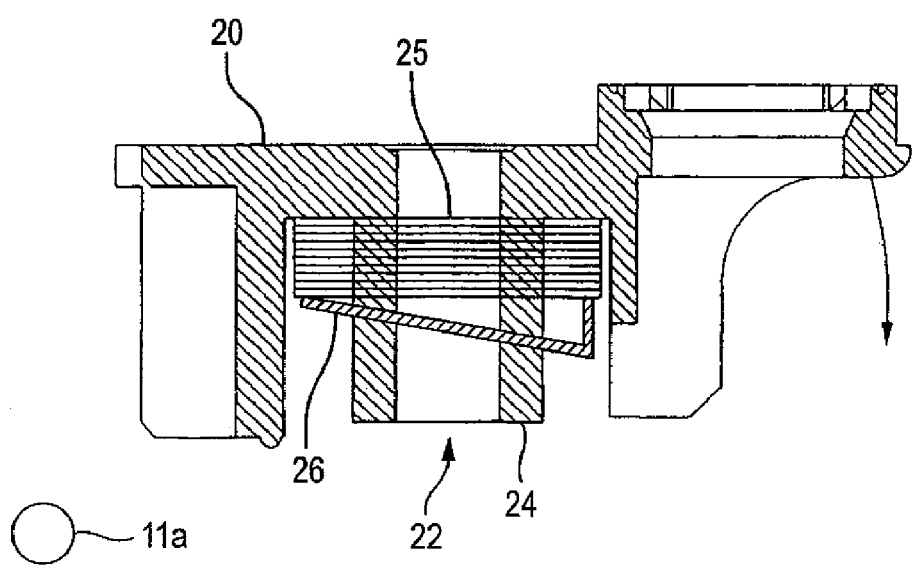
FIG. 5 is a sectional view of another optical pickup.
Figure 6:
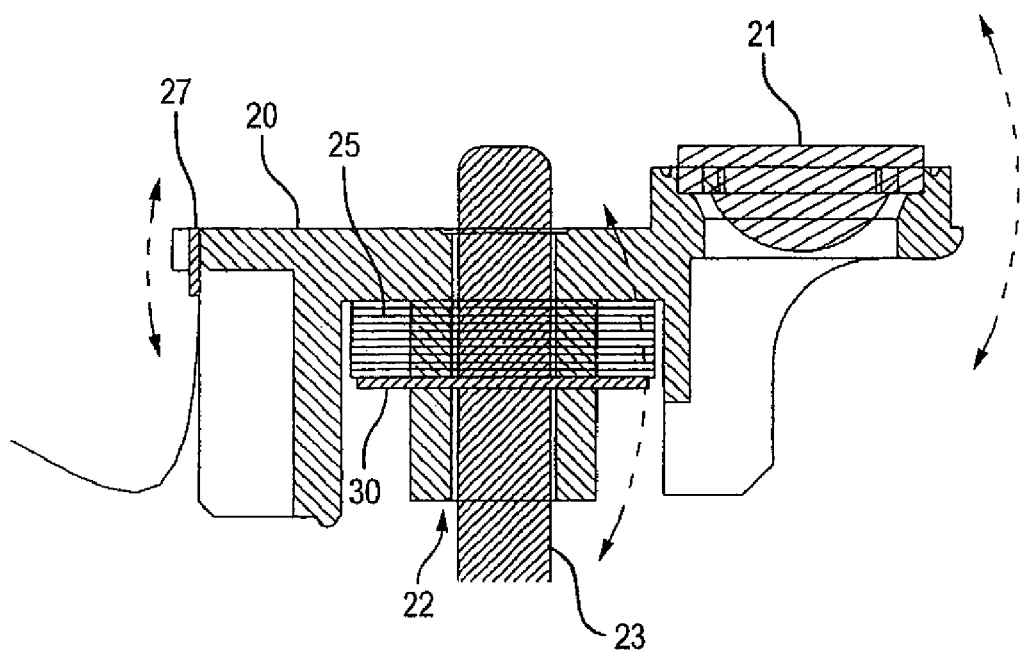
FIG. 6 is a sectional view of a conventional optical pickup.

Now, a predetermined clearance (e.g. 5 mm) is provided between the sliding hole 22 of the lens holder 20 and the shaft 23 of the lens holder supporting portion. Conventionally, this clearance produced wobbling during the movement of the lens holder 20 in the above alignment. However, according to the configuration of the magnetic plate 26, it is attached in the state inclined previously so that the direction of magnetic inclination can be fixed. Namely, conventionally, even when it is intended that the magnetic plate is horizontally attached, the magnetic plate was inclined in various directions owing to an attaching error. On the other hand, according to this embodiment, the magnetic plate 26 is attached in the state inclined previously so that the inclination angle of the magnetic plate 26 can be controlled. Thus, the device can be designed considering the stable direction (arrow direction in FIG. 2) based on the inclination of the magnetic plate 26. For example, as shown in FIG. 5, if the magnetic plate 26 is rotated horizontally by 180° from the state of FIG. 2, the stable direction of the lens holder 20 is a downward direction as indicated by arrow. Thus, the inclination angle of the magnetic plate 26 can be designed considering the installing posture of the optical disk apparatus such as the vertical or horizontal installation thereof. As a result, the instable factors leading to the inclination of the objective lens 21 are reduced, thereby permitting the disk information to be read out stably.

The above disk drive device 10 is mounted on the optical disk apparatus for reproducing and audio- or video-recording an optical disk such as CD and DVD. With reference to a DVD player which is an example of the optical disk apparatus, its configuration will be explained. The DVD player includes the disk drive device 10 for reading out, as a data bit stream, the video data recorded in digital form on a DVD; a decoder for restoring the video data and audio data before compression conversion from the data bit stream thus read out, thereby reproducing the picture and voice; a control unit for controlling the operation of the entire DVD player; an EEPROM for storing a predetermined frequency which is a standard for audiovisual limitation; a light receiving circuit for receiving an operation command by a blinking signal of infrared rays from a remote controller; and an operation panel which permits a user to execute an operation command for the DVD player on the side of the DVD player. As an accessory, there is the remote controller for entering the above operation command.

The disk drive device 10 includes a servo signal processing unit for driving the optical pickup 12 to a predetermined position by supplying a control signal to the magnetic driving unit for focusing, etc., an RF amplifier for amplifying the signal read out from the optical pickup to create a predetermined control signal, and a CD signal processing unit for restoring the digital data from the amplified signal so that the restored data are converted into the data bit stream to be outputted.

These components operate correlatively under the control by the control unit so that the data bit stream recorded on the DVD can be outputted to the decoder. The decoder separates the data bit stream into a video component and an audio component and MPEG-decodes them so that they are restored as the video signal and audio signal and outputted in synchronism with each other.

The control unit incorporates a ROM with a predetermined control program recorded thereon and a RAM used as a work area as well as a CPU serving as a main component for processing, and a control circuit for controlling external devices. Under the control by this control unit, as described above, the disk drive device 10 and decoder reproduce the picture and voice.

This invention provides an optical disk apparatus for reproducing and audio/video recording an optical disk such as CD and DVD and a disk drive device incorporated in the apparatus. They can be applied to the apparatus in which the lens holder for the optical pickup moves in the direction of an optical axis along the shaft.

What is claimed is:

1. An optical disk apparatus comprising:
   a disk drive device having a guide shaft secured to a chassis and an optical pickup which is rotatably attached to the guide shaft and moves along the guide shaft,
   wherein the optical pickup comprises a lens holder holding an objective lens for emitting a light beam to be projected onto an optical disk and having a sliding hole, a shaft passing through the sliding hole, a focus coil wound around an outer wall of the sliding hole, and a hexagonal magnetic plate fit over the outer wall of the sliding hole so as to be adjacent to the focus coil, and
   one side of the hexagonal magnetic plate is bent toward the focus coil so that the magnetic plate is inclined with respect to a plane having a normal line parallel to a sliding direction of the lens holder.

2. A disk drive device comprising a guide shaft secured to a chassis and an optical pickup which is rotatably attached to the guide shaft and moves along the guide shaft, wherein
   the optical pickup comprises a lens holder holding an objective lens for emitting a light beam to be projected onto an optical disk and having a sliding hole, a shaft passing through the sliding hole, a focus coil wound around an outer wall of the sliding hole and a magnetic plate fit over the outer wall of the sliding hole,
   the magnetic plate is inclined with respect to a plane having a normal line parallel to a sliding direction of the lens holder, and
   one end of the magnetic plate is bent toward the focus coil and is in contact with the focus coil.

* * * * *